Nov. 14, 1961
M. E. COBB
3,008,341
TRANSMISSION MECHANISM
Filed July 6, 1959
3 Sheets-Sheet 1
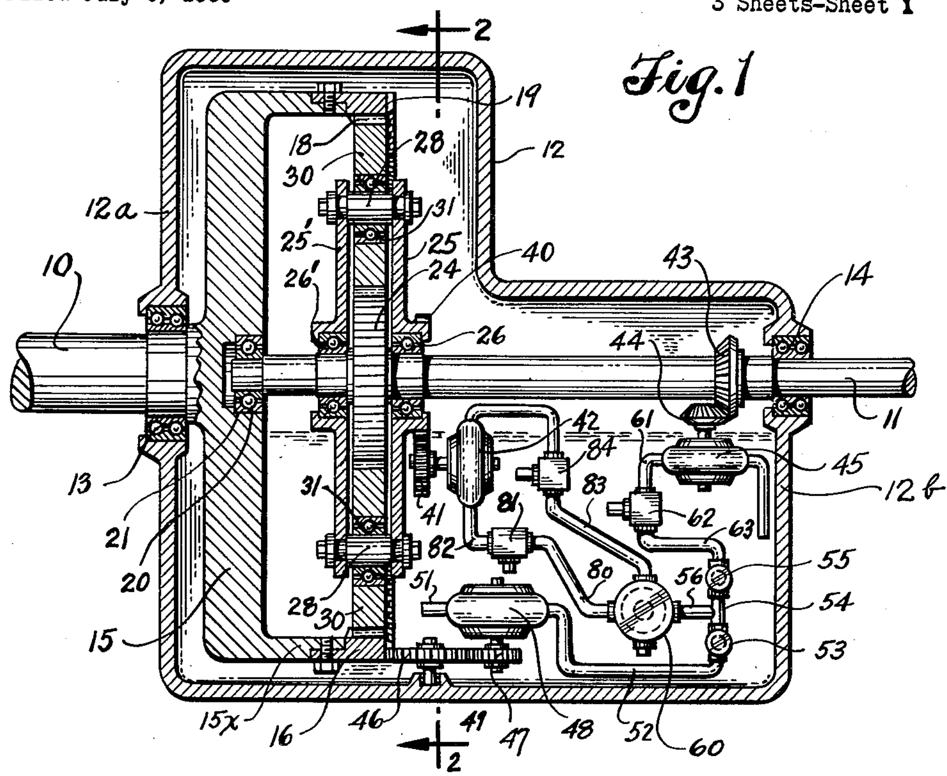
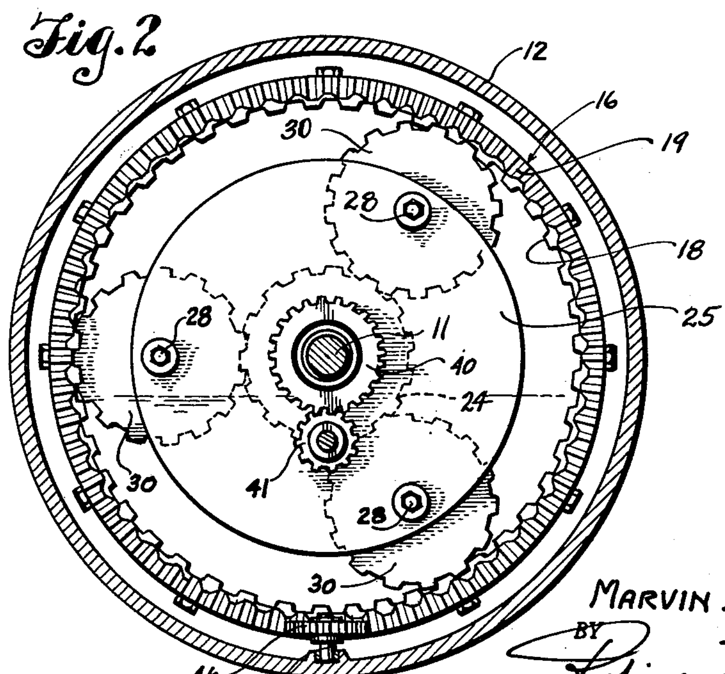
INVENTOR.
MARVIN E. COBB
BY
Robinson & Berry
ATTORNEYS TRANSMISSION MECHANISM
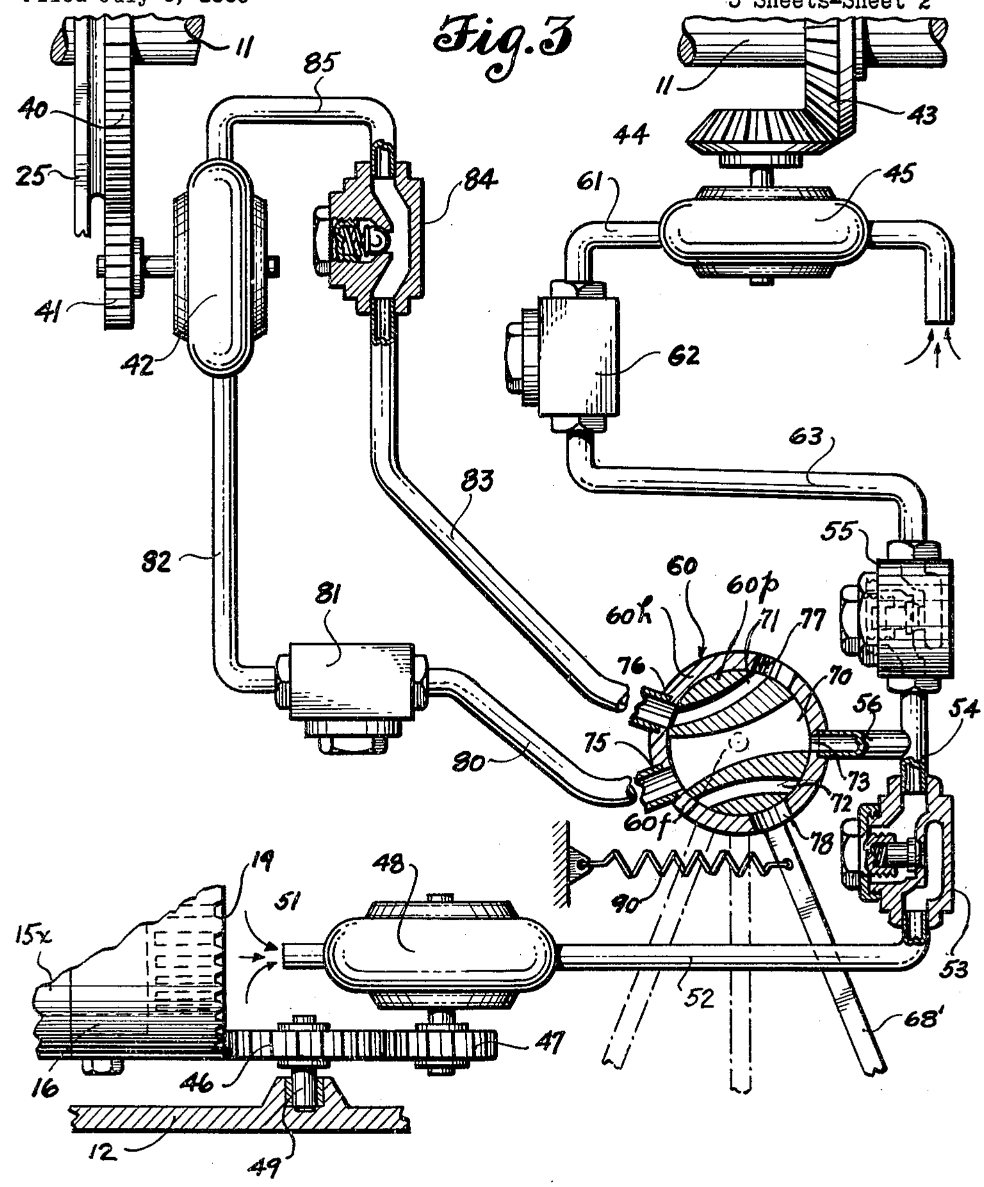
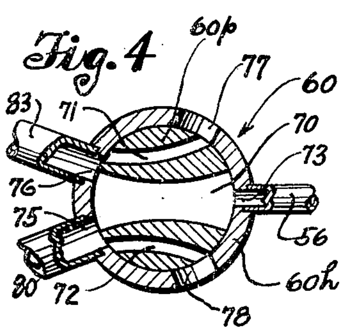
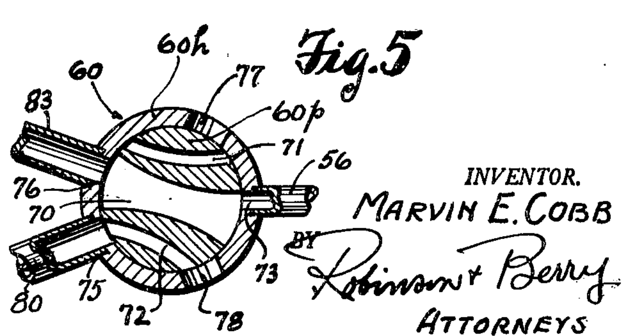
INVENTOR.
MARVIN E. COBB
BY Robinson & Berry
ATTORNEYS Nov. 14, 1961 M. E. COBB 3,008,341
TRANSMISSION MECHANISM
Filed July 6, 1959 3 Sheets-Sheet 3
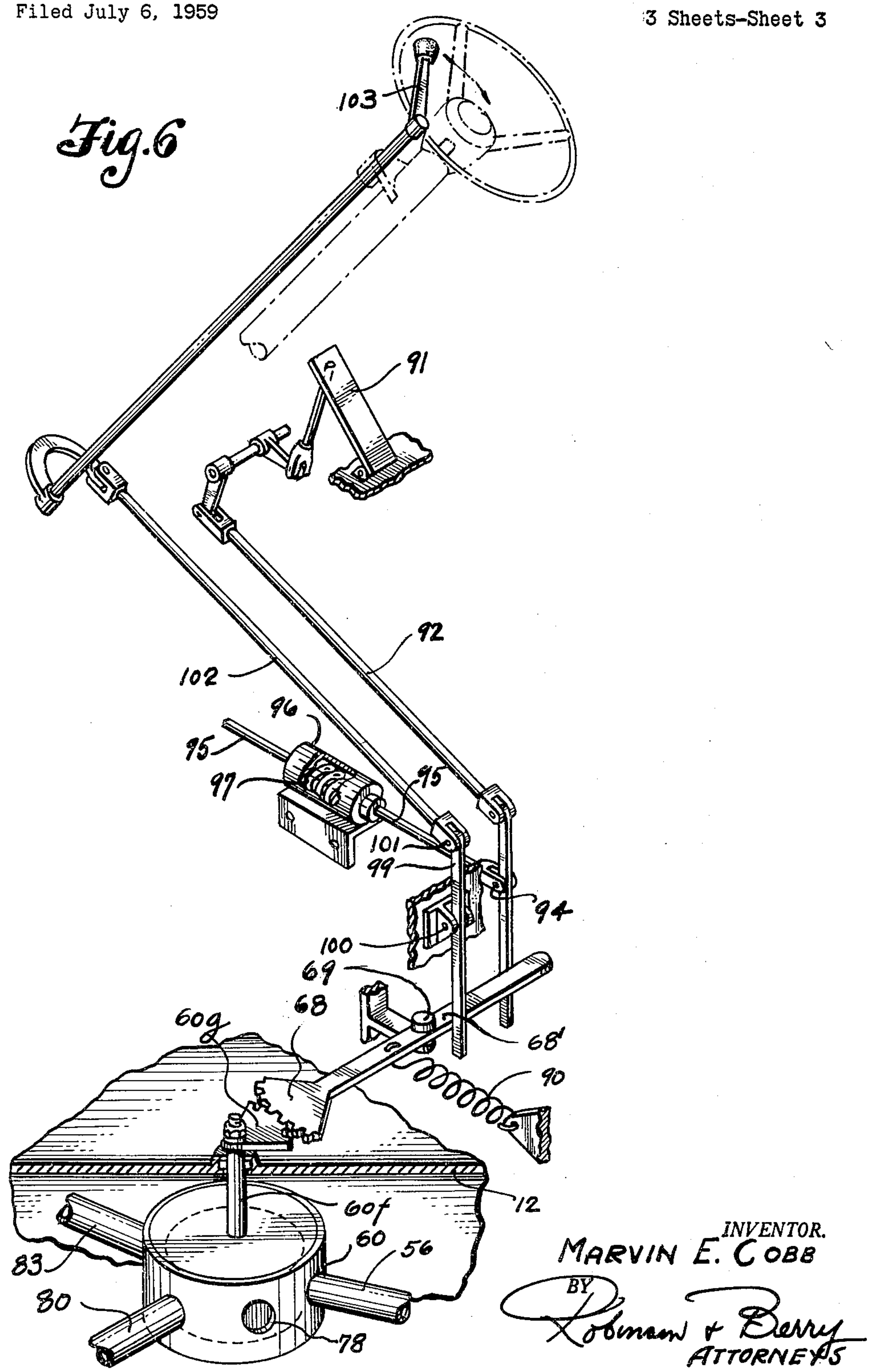
INVENTOR.
MARVIN E. COBB
BY Robinson & Berry
ATTORNEYS United States Patent Office 3,008,341 Patented Nov. 14, 1961

3,008,341

TRANSMISSION MECHANISM

Marvin E. Cobb, Box 287, Lowell, Wash.

Filed July 6, 1959, Ser. No. 825,205
5 Claims. (Cl. 74—472)

This invention relates to power transmission gearing of a type suitable for use in the driving of present day automobiles, trucks and the like, but not restricted thereto, and comprising epicyclic, infinitely variable speed gears and means for so controlling them as to produce any forward or reverse driving ratio ranging between the top speed possible by the mechanism and an idling operation.

It is the principal object of the present invention to provide a novel power transmission mechanism of the above stated character including a planetary gear system and novel hydraulic means through which an infinitely variable ratio between input and output shafts is possible.

It is also an object of this invention to provide a transmission mechanism of the character above stated wherein the hydraulic means for speed and direction control is inherently automatic and is indirectly powered by the power input shaft.

Another object of the invention is to provide a hydraulic ratio and direction control for the present transmission mechanism that is operable through connection with the conventional throttle or accelerator pedal when the mechanism is used in driving an automobile.

Still further objects and advantages of the present invention reside in the details of construction and combination of parts embodied in the control system and in their mode of operation, as will hereinafter be fully described.

In accomplishing the above mentioned and other objects of the invention, I have provided the improved details of construction, the preferred forms of which are illustrated in the accompanying drawings, wherein:

FIG. 1 is a vertical, longitudinal section of a transmission mechanism embodied by the present invention.

FIG. 2 is a cross-section of the mechanism, taken on the line 2—2 in FIG. 1.

FIG. 3 is a schematic illustration of the hydraulic control means for varying the driving speed and direction of the power output shaft of the present transmission mechanism.

FIG. 4 is a cross-sectional view of the present control valve employed in the hydraulic system, showing it as set in "neutral" position.

FIG. 5 is a similar view with the valve as set in "reversing" position.

FIG. 6 is a schematic layout of the control valve and its operating connections with accelerator pedal, throttle and position selector lever.

Referring more in detail to the drawings and particularly to FIG. 1.

A power driven shaft which, in an automobile, would be the engine drive shaft, is designated by numeral 10 and the shaft which is driven thereby through the present mechanism, is designated by numeral 11. The epicyclic gearing and hydraulic control means for the mechanism is here shown to be enclosed in a liquid tight housing designated in its entirety by numeral 12. It is also here shown that the drive shaft 10 extends through and is supported by an anti-friction bearing 13 that is mounted in what will be designated as the forward end wall **12*a* of the housing 12. Shaft 11 extends through the opposite or rear end wall 12*b* where it is likewise rotatably supported in an anti-friction bearing 14**.

Formed integrally with shaft 10, or otherwise fixed rigidly thereto, and coaxially thereof, is a rearwardly facing, bowl-like member 15 of substantial diameter having a cylindrical peripheral portion **15*x* to which a gear ring 16 is bolted; this gear ring being mounted coaxial of the axial lines of shafts 10 and 11 and is internally toothed to form the internal ring gear which is designated at 18 in FIG. 2. The gear ring 16 also is toothed entirely about its end surface, as at 19**, thus to serve as a pump driving gear, as will presently be explained.

It is to be observed in FIG. 1, that the inner end portion of shaft 11 is rotatably supported in an anti-friction bearing 20 that is set in a socket 21 formed in the base of the bowl-like member 15 coaxially thereof, and it can be rotatably driven in opposite directions independently of the speed and direction of shaft 10.

Keyed or otherwise fixed on the shaft 11, in the plane of ring gear 18, is a pinion gear 24, here shown to be approximately one-third the diameter of ring gear 18 but not necessarily restricted to that proportion. Also, mounted for rotation on shaft 11 closely adjacent opposite faces of gear 24, are disks 25—25′; these being mounted by anti-friction bearings 26—26′ that are contained within the hub portions of the disks, respectively, and are fitted to the shaft 11. The disks 25—25′ are rigidly joined in spaced relationship, by a plurality of short arbors 28 here shown to be three in number and angularly spaced and also at equal distances from the axis of the shaft 11. Each of the arbor shafts 28 mounts a gear wheel 30 for rotation thereon, and each of these gears is in operative mesh with the pinion gear 24 of the planetary system and also with the internal ring gear 18. The gear wheels 30 are mounted to turn on anti-friction bearings 31 mounted on the arbor shafts as shown in FIG. 2.

In the use of this mechanism, the housing 12 is filled to a substantial depth, as indicated in FIG. 1 with a hydraulic medium, such as oil, which serves both as a lubricant and as a power transmitting medium, as presently explained.

The hydraulic control for the planetary gear system is shown schematically in FIG. 3, and in FIG. 1 it has been shown that the hub portion of disk 25 is externally toothed thus to provide a driving gear 40 that meshes with the driving gear 41 of a hydraulic pump 42. It is also shown in these views that shaft 11 has a beveled pinion gear 43 fixed thereon, close to the rear end wall of housing 12, which operates in driving mesh with the beveled driving gear 44 of a hydraulic pump 45, and it is further shown that the gear 19 as applied to gear ring 16 operates in driving mesh with an idler gear 46 that, in turn, is in driving mesh with the drive gear 47 of a hydraulic pump 48. The idler gear 46 is here shown to be mounted on a stub shaft 49 that is fixed in the bottom wall of housing 12.

The several hydraulic pumps would preferably be of the sliding vane type or of the piston type and operable in either direction. Also, these pumps are preferably fixed supported in the housing 12 by suitable means not herein shown.

The hydraulic pump 48 which operates at all times in the same direction has its intake 51 located below the level of the hydraulic medium as confined in the housing 12, and has its discharge connected by a pipe line 52 with a check valve 53 as shown in FIG. 3, which valve has its discharge side connected by pipe 54 with a second check valve 55. Also, it is noted that a pipe 56 leads from pipe 54 to a direction and ratio control valve which is designated in its entirety by numeral 60. Pump 45 communicates at one side with the hydraulic medium supply in housing 12 and has its other side connected by a pipe 61 with a pressure relief valve 62 which is connected by pipe 63, through check valve 55 with the pipe 54. Valve 55 is as shown in FIG. 3.

The control valve which is designated by numeral 60 comprises a cylindrical housing **60*h* in which a rotary plug 60*p* is fitted. The valve plug when located inside the housing 12 has an adjusting shaft 60*f* extended therefrom to outside the housing, the position of the plug and its rotative movements being controlled through a lever 68 extending radially from shaft 60*f* at a convenient location outside the housing as seen in FIG. 6. Lever 68** is in the form of a gear segment.

It is shown in FIGS. 3, 4 and 5 that the plug **60*p* has a diametric or central passage 70 of substantial width formed therethrough and passages 71 and 72 are formed therethrough at opposite sides of passage 70. The housing 60*h* has an inlet 73 to which the pipe 56 is connected. One end of passage 70 remains in communication with inlet 73 for all positions of adjustment of the plug. The housing 60*h* also has ports 75 and 76 with which the other end of plug passage 70 may be selectively registered by rotative adjustment of the plug to its opposite limits. The passage 70 will be connected to some extent with both ports 75 and 76, as has been shown in FIG. 4, by placing the plug at its intermediate or "neutral" position. The housing 60*h* also has an outlet 77 with which one end of the plug passage 71 will register when its opposite end is in registration with port 76. Also, the housing has an outlet port 78 with which one end of the plug passage 72 will register when the other end of the passage 72 is registered with port 75. Ports 77 and 78 are each in open communication with the hydraulic medium contained in housing 12. When the plug is in its neutral position, one end of each of passages 71 and 72 are partly in communication with ports 75 and 76 and their other ends are registered with the ports 77 and 78, respectively. Also, in this neutral position of FIG. 4, one end of passage 70 is registered with port 73 and its other end registers, to slight extent with outlet ports 75 and 76**.

Leading from the outlet 75 of the valve housing **60*h* is a pipe 80 which connects through a pressure relief valve 81 and a pipe 82 with one side of pump 42. Likewise, connected to outlet 76 of the valve housing 60*h* is a pipe 83 that leads through a pressure relief valve 84 and pipe 85 to the other side of pump 42**.

It will be understood by reference to FIG. 1 that the pump 48 will operate at all times in the same direction due to its being driven by gear 19 which is driven by shaft 10, which shaft always turns in the same direction. The direction of turning of disks 25—25' about shaft 11 depends on the direction of driving of the pump 42 as presently understood. The direction of operation of pump 45 is dependent on the direction of rotation of shaft 11 which is under control of the epicyclic gear system. Only in case of very high ratio of output to input speed, in this case about 3 to 1, would disks 25—25' and pump 42 reverse their normal directions.

In operation, pump 48 draws in the hydraulic medium from housing 12, and discharges it through pipes 52 and 54 to valve 60. It should be noted that there is a 4 to 1 ratio of change between pump 45 and pump 42. That is, a change in speed (increase, for instance) of one r.p.m. for pump 42 is necessarily accompanied by a decrease in speed for pump 45 of four r.p.m. and an increase in speed of pump 45 of 1 r.p.m. would necessitate only a one-fourth r.p.m. reduction in speed for pump 42. This is probably the most important single aspect of the whole transmission. This is the characteristic that enables it to be sensitive to the torque required, and to be able to inherently automatically adjust the ratio accordingly. This is the vital difference between this transmission and others of similar intent.

When valve 60 is set in its neutral position, as in FIG. 4, one end of passage 70 is registered with port 73 and its other end communicates to slight extent with both outlet ports 75 and 76.

For control of the transmission mechanism, various systems might be employed. A suitable means has been shown in FIG. 6. In this view, the valve 60 is shown to be equipped with a control shaft **60*f* terminating in a gear segment 60*g* meshing with gear segment 68 from which a lever arm 68' extends. Lever arm 68' is pivoted between its ends, as at 69. The valve plug 60*p* normally is adjusted to valve reversing position by pull of a coil spring 90 attached to the inner end of the lever arm 68'**.

The accelerator pedal 91 for engine speed control is here shown to be connected by a link 92 with the upper end of a lever 93 which is pivoted at a medial point 94 to one end of a rod or link 95 that is slidable through a fixedly mounted housing 96 wherein a spring 97 is contained to normally urge the throttle toward closed position. At its lower end the lever 93 engages the forward side of free end of lever arm 68'. The arrangement is such that when foot pressure is applied to the pedal 91, the lever 93 is caused to pivot on support 94 at its point of connection 94 with rod 95 to move the valve lever arm 68' and thus adjust valve 60 from "reverse" through "neutral" to "forward" position, as seen in FIG. 3. The resistance of spring 97 is so adjusted that it will be overcome at this point and the throttle linkage 95 will be actuated accordingly to control engine speed.

It is further shown in FIG. 6 that the position of lever arm 68' may be manually adjusted to a set position through adjustment of a lever 99 that is pivoted between its ends, as at 100. The lower end portion of this lever 99 engages the end portion of lever arm 68' opposite lever 93 and at its upper end it is pivotally connected, as at 101, with a selector link 102 that may be adjusted to "reverse," "neutral" and "forward" positions by means located in a position readily accessible to the vehicle driver, that is by the lever 103 shown.

With the gear system so arranged, it will be understood that if the engine shaft is being driven counter-clockwise and the disks 25—25' are held against turning about shaft 11, the output shaft 11 will then be driven clockwise at a speed approximately three times that of the shaft 10. This could be the forward driving direction.

If the disks 25—25' are held against turning relative to gear 18, the output shaft 11 will then rotate in unison with the shaft 10. This could be the reverse driving direction.

If no controlling force is applied to the carrier disks of the planetary gears 30, they will rotate in the same direction as to driving gear 18 but at approximately three-fourths its speed. This will result in no turning of the output shaft 11. This is the "neutral" position.

If a force is applied to the planetary gear carrier disks to retard their normal free turning, a forward torque will be applied to output shaft 11, the ratio being determined by the amount of retardation. If the carrier disks are held against any turning, the ratio will be approximately three to one.

If force is applied to reverse the normal counter-clockwise direction of the carrier disks, 25—25', the ratio will increase accordingly above three to one. If a force is applied to the carrier disks in such way as to accelerate their turning in normal direction, then a reverse torque will be applied to shaft 11, the ratio depending upon the relative increase in speed.

In the present showing of the transmission mechanism, as designed for automobile driving, the hydraulic control assembly should be sensitive to the torque required. That is, as the automobile starts up an incline, the torque required to move it increases, and to maintain optimum performance, the ratio should drop. If the automobile starts down hill, then the torque requirements are decreased, the ratio should rise and the engine speed could be decreased to maintain constant road speed, if desired.

Assuming that the mechanism is installed in an automobile, operation is as follows: The valve 60 is set in reverse position for starting. When the engine is first started, the output shaft 11 is not turning and therefore pump 45 will then be idle. Pump 48 will be driven by its connection with ring gear 18 and pump 42 will be driven by the gear 40 which will be rotated approximately at three-fourths the speed of gear 18. The intake of pump 42, when turning in its normal free direction, is through pipes 83 and 85 and its output is through pipes 82, 80 and valve passage 72. In order for pump 48 to cause pump 42 to speed up, thus to produce a reverse torque on the output shaft 11, pump 48 must have a slightly greater output than pump 42 under idling conditions. This is provided for by pump design.

For reasons presently obvious it is desirable that the valve 60 be set in its reverse position, as in FIG. 5, whenever the accelerator pedal is released, thus to provide that when the engine has been started and is idling, the output from pump 48 will be delivered through valve 60, pipes 83 and 85 to pump 42 and discharged from pump 42 through pipes 82, 80 and valve passage 72. If this condition causes "creeping," it may be overcome, for example, by providing relief valve 84 with a constant minimum opening that will result in eliminating reverse torque in pump 42. The reason for having valve 60 return to reverse position when the accelerator pedal is released is to provide compression braking in the natural automatic manner to which all drivers are accustomed. Another way to eliminate creeping is to provide the intake to pump 48 with a valve which would be opened by a governor at engine speeds above idling.

After starting the engine, valve 60 is adjusted to forward position by the initial depression of the accelerator pedal. With valve 60 in forward setting, further depression of accelerator pedal 91 will actuate the engine throttle and the engine will speed up, and with this the pump 48 will force fluid through valve passage 70 and into pipes 80, 82 causing a back pressure against the pump 42, thus slowing it down and causing a forward torque to be applied to shaft 11. As soon as shaft 11 begins to turn, pump 45 will be set in operation. Output from pump 45 will be delivered through pipes, 61, 63, 54 and 56 to valve 60 and thus added to that from pump 48. This causes increased back pressure against pump 42, as driven by gear 40, retarding it further and thus raising the ratio.

If, on assuming cruising conditions of the driven automobile with equilibrium established the load is increased, such as, for example, by moving up an incline and the engine speed is held constant, the road speed will drop and it will be desirable to have the ratio lower to increase torque. Accordingly, as load increases and the output shaft slows down, the planetary gear carrier disks speed up. This tends to increase the back pressure against pump 42, however, the simultaneous reduction in speed and output of pump 45 more than offsets the tendency of pump 42 to increase its back pressure.

When valve 60 is set in the forward position, as in FIG. 3, there is no input to pump 42. Under idling conditions, pump 42 must be turning in such direction that its output, if any, is through pipe 82. Therefore, in forward position, fluid from valve 60 will cause back pressure against pump 42, retarding its motion, and imparting a forward torque to shaft 11. All the fluid escapes through pressure relief valve 81, except in the aforementioned case of very high ratios. The back pressure against pump 42, in pipe 82, must be sufficient to bring pump 42 to a standstill in order to produce a ratio of three to one. The pressure necessary to do this is relative to the load. That is, a lighter load would require less pressure to stop pump 42. Greater pressure than this would actually reverse the direction of rotation of pump 42, resulting in ratios higher than three to one and causing a flow of fluid through pump 42, and freely vented through pipe 85, valve 84, pipe 83, and ultimately through port 77.

In going down hill, the opposite process takes place.

As the torque requirements lessen, the output shaft speeds up, the output from pump 45 increases, causing greater retardation of pump 42 and therefore higher ratios.

If push starting of the engine is desired, or if braking compression is desired during travel, this is obtained by lifting the foot pressure off the gas pedal. This adjustment incidentally returns the engine throttle to closed position.

If the vehicle is being pushed forward for starting, the gear 24 rotates with shaft 11 clockwise. To supply counterclockwise torque to the ring gear 18 and through it to the engine shaft 10 for starting, the planetary gear carrier disks must be retarded from turning clockwise. The same condition exists when compression, braking is desired. Therefore to obtain either compression braking or push starting, the valve 60 must be put in reverse position as occamplished by releasing the accelerator pedal. A condition close to free wheeling may be obtained by keeping the accelerator pedal slightly depressed, resulting in placing the valve in neutral position.

Furthermore, any degree of compression braking may be attained by further releasing the accelerator pedal, all with the throttle in idling position.

Attention is called to the fact that the check valve 55 is necessary to prevent pressure from pump 48 being wasted to pump 45 while idling. The check valve 53 likewise keeps pressure from pump 45 from being wasted to pump 48 during push starting. Relief valve 62 may be, in some instances, needed to match the output from pump 45 to the requirements of the system.

It is to be understood that the valve 60 can be arranged in various ways, both inside and outside of the housing. It is also to be understood that the control of the valve may be effected by various means and in various ways without departing from the spirit of the invention. The showing of the valve 60 and its controlling mechanism as illustrated in FIG. 6 is only one of various ways and means for effecting its control and is not to be understood to be the only way or means that may be employed.

What I claim as new is:

1. In a power transmission mechanism of the character described, in combination, a drive shaft, a driven shaft, an epicyclic gear system providing a driving connection between said drive shaft and said driven shaft; said epicyclic system comprising a ring gear rotatable in unison with said drive shaft, a central gear fixed on said driven shaft, planetary gears meshing with said ring gear and said central gear and carrier disks mounting said planetary gears for planetation about said central gear; a second ring gear mounted coaxially of the first mentioned ring gear and rotatable therewith; one of said carrier disks having a hub portion rotatable about said driven shaft and mounting an annular gear band thereon, a container with a supply of hydraulic pressure medium therein, a first reversible pump having a geared driving connection with the second mentioned ring gear and operable in accordance with direction of turning of said second mentioned ring gear, a second reversible pump having a driving connection with said driven shaft and operable in accordance with its speed and direction of rotation, a third reversible pump having a geared driving connection with said annular gear band of said one of the carrier disks for its operation in accordance with speed and direction of rotation of said disk, a manually adjustable control valve having an inlet and having a first outlet and a second outlet; said first pump having an intake port open to said supply of hydraulic pressure medium and having a discharge pipe leading to the inlet of said control valve; said second reversible pump having an inlet in direct connection with said supply of hydraulic medium and having a discharge pipe connected to the discharge pipe of the first reversible pump and through it with the inlet of said control valve; said third reversible pump having pipe lines leading to its opposite sides, respectively, from said first and second outlets of said control valve; each of said pipe lines being equipped with a pressure controlled relief valve; said control valve having a plug member manually adjustable therein for selective delivery of hydraulic pressure medium received through its inlet to one or the other of said pipe lines to one side of said third reversible pump for discharge therefrom from the opposite side to said container through the other pipe line and the pressure relief valve therein.

2. The transmission mechanism of claim 1 wherein the discharge connections of said first and second pumps with the inlet side of said control valve are each equipped with a check valve.

3. The combination recited in claim 1 wherein the connection from said second pump with said control valve inlet includes a pressure relief valve between the pump and check valve to discharge into said container.

4. The combination recited by claim 1 including also a control valve operating mechanism and means adapting it for automatic control in conjunction with the throttle mechanism of an automobile.

5. The combination recited by claim 1 wherein the rotatable plug member of said control valve has an operating mechanism comprising a lever pivotally mounted between its ends and having a geared connection at one end with said plug member for its rotative adjustments, a spring attached to said lever to reutrn the valve to one position and throttle movable means for acting against the other end of the lever for valve adjustment.

References Cited in the file of this patent

UNITED STATES PATENTS

| | | |
|---|---|---|
| 2,285,431 | Grossenbacher | June 9, 1942 |
| 2,583,656 | Lay | Jan. 29, 1952 |